(12) United States Patent
Kubota et al.

(10) Patent No.: US 7,022,396 B1
(45) Date of Patent: Apr. 4, 2006

(54) BIAXIALLY ORIENTED FILM HAVING SPECIFIED MICRO PROTRUSIONS

(75) Inventors: Akira Kubota, Nara (JP); Shoji Nakajima, Otsu (JP); Yukari Nakamori, Shiga (JP); Tetsuya Tsunekawa, Otsu (JP)

(73) Assignee: Toray Industries, Inc., Tokyo (JP)

( * ) Notice: Subject to any disclaimer, the term of this patent is extended or adjusted under 35 U.S.C. 154(b) by 592 days.

(21) Appl. No.: 09/830,215

(22) PCT Filed: Aug. 24, 2000

(86) PCT No.: PCT/JP00/05692

§ 371 (c)(1),
(2), (4) Date: Apr. 24, 2001

(87) PCT Pub. No.: WO01/14462

PCT Pub. Date: Mar. 1, 2001

(30) Foreign Application Priority Data

Aug. 25, 1999 (JP) .................................. 11-237724
Dec. 9, 1999 (JP) .................................. 11-350004
Mar. 3, 2000 (JP) .............................. 2000-058420

(51) Int. Cl.
*G11B 5/66* (2006.01)
*G11B 5/70* (2006.01)

(52) U.S. Cl. ................. 428/141; 428/323; 428/847.4

(58) Field of Classification Search ............ 428/141, 428/323, 327, 402, 407, 694.56, 694, 52, 428/694.55, 847.2, 847.3, 847.4, 847.7
See application file for complete search history.

(56) References Cited

U.S. PATENT DOCUMENTS

| 4,732,814 A | * | 3/1988 | Hatada et al. | 428/480 |
| 4,981,897 A | * | 1/1991 | Kawai et al. | 524/414 |
| 5,354,595 A | | 10/1994 | Yamamoto et al. | |
| 5,389,422 A | * | 2/1995 | Okazaki et al. | 428/141 |
| 5,527,594 A | * | 6/1996 | Kinoshita et al. | 428/212 |
| 5,965,233 A | * | 10/1999 | Tojo et al. | 428/141 |

FOREIGN PATENT DOCUMENTS

| CN | 1202260 A | | 12/1998 |
| EP | 0398075 | * | 11/1990 |
| EP | 0522758 | * | 6/1992 |

\* cited by examiner

*Primary Examiner*—Holly Rickman
(74) *Attorney, Agent, or Firm*—Kubovcik & Kubovcik

(57) ABSTRACT

An object of the present invention is to provide a high-quality biaxially oriented film exhibiting an excellent electromagnetic conversion property, traveling durability, magnetic head traveling performance, etc. as a magnetic recording medium. The object of the present invention is achieved by a biaxially oriented film including a polymer alloy composed of polyester (polymer 1) and a thermoplastic resin (polymer 2) other than the polyester as essential components, wherein micro protrusions having a height of 2 to 50 nm are formed at a density of 1,000,000 to 90,000,000/mm$^2$ on at least one surface.

25 Claims, No Drawings

BIAXIALLY ORIENTED FILM HAVING SPECIFIED MICRO PROTRUSIONS

TECHNICAL FIELD

The present invention relates to a biaxially oriented film having improved quality, particularly improved surface properties, as compared with conventional polyester films.

BACKGROUND ART

Specifically, the present invention relates to a biaxially oriented film suitable for, for example, a base film for a magnetic recording medium, particularly a data storage magnetic tape and digital video tape, and suitable for various industrial material films for a capacitor, a heat transfer ribbon, base paper for a thermosensitive stencil printing plate, etc.

Although a large-area film can be continuously produced from polyester, such a film cannot be obtained from other materials. By making use of the properties of polyester films, such as strength, durability, transparency, flexibility, and the property that surface properties can be imparted, polyester films are used in various fields in which the polyester films are greatly demanded, such as the fields of various industrial materials for a magnetic recording medium, a capacitor, a heat transfer ribbon, thermosensitive stencil printing plate base paper, and the like, agricultural materials, packing materials, building materials, etc.

Particularly, from the viewpoint of ease of surface design, the polyester films are used in various fields, and are particularly useful as base films for magnetic recording media. A polyester film is frequently used in the form of a biaxially oriented film in order to improve mechanical properties, thermal properties, electric properties, etc. In a magnetic recording medium, reduction in size of a recording signal has recently been required for decreasing the weight and size of an apparatus and lengthening the recording time. In order to reduce the size of a recording signal and increase the recording density, the surface of a film, particularly the film surface on the magnetic side, is required to have flatness. Furthermore, in a magnetic recording drive, quality is improved by using a MR head, and thus coarse protrusions on the surface of a base film possibly damage the MR head, thereby making severe the requirement for surface flatness of the base film.

On the other hand, with a film having an excessively flat-surface, not only the handling property of the film deteriorates, but also the frictional coefficient between the film surface and a magnetic head is increased in use for a magnetic tape, thereby causing the problems of easily deteriorating the traveling performance of the tape, the durability of the tape surface, and causing wear of the magnetic head.

Therefore, a laminated polyester film (for example, Japanese Unexamined Patent Publication No. 7-272249) containing particles for forming surface protrusions, and coating of a discontinuous film containing fine particles (for example, Japanese Unexamined Patent Publication No. 3208639), etc. are conventionally known.

However, in use of a high concentration of fine particles, the surface energy significantly increases as the particle diameter decreases, and thus the surfaces of the particles must be treated by, for example, coating with a water-soluble polymer in order to suppress aggregation. However, there are the problems of deteriorating the coated film, reducing productivity, and increasing the coat. Even by using these methods, coarse protrusions are inevitably formed by aggregation as the concentration of the particles is increased to some extent, thereby causing difficulties in forming uniform micro protrusions at a high density by using the particles.

Therefore, as a method of forming uniform micro protrusions on the surface without using particles, a method using micro crystals in a laminated portion is known (for example, Japanese Unexamined Patent Publication No. 7-1696). However, this method comprises stretching an unstretched film having a surface layer crystallized in a pre-heating step, and thus has the problem of causing damage due to the drawing rolls used. Therefore, at present, the problems remain unsolved in application to a high-density magnetic recording tape. Other known methods include a method using a polymer for forming a phase separation structure with a non-mesogenic polyester (for example, Japanese Unexamined Patent Publication No. 10-298313). However, in this case, the large size of each of the polymer domains subjected to phase separation is reflected in formation of a rough surface, and under the present condition, this method is thus far short of application to a high-density recording magnetic tape having an evaporated magnetic layer which is required to have a flat surface.

DISCLOSURE OF INVENTION

An object of the present invention is to provide a biaxially oriented film which exhibits an excellent electromagnetic conversion property and traveling performance for a magnetic head, particularly, when used as a magnetic recording medium base film, and which is suitable as a base film for a high-density magnetic recording tape having a surface with high durability to the magnetic head.

The object of the present invention can be achieved by biaxially oriented film comprising a polymer alloy composed of polyester (polymer 1) and a thermoplastic resin (polymer 2) other than the polyester as essential components, wherein micro protrusions having a height of 2 to 50 nm are formed at a density of 1,000,000 to 90,000,000/mm$^2$ on at least one surface.

The object of the present invention can also be achieved by a biaxially oriented film comprising a laminated structure comprising at least tree layers three layers of A layer/B layer/C layer, wherein the A layer comprises a film composed of polyester and polyetherimide and has a surface roughness Ra$_A$ of 0.2 to 10 nm, and the layer opposite to the A layer has a surface roughness Ra$_C$ of 1 to 30 nm.

BEST MODE FOR CARRYING OUT THE INVENTION

The present invention will be described in detail below.

A biaxially oriented film of the present invention comprises a polymer alloy composed of polyester (polymer 1) and a thermoplastic resin (polymer 2) other than polyester as essential components.

In the present invention, the polymer alloy represents a polymeric multi-component system which may be a block copolymer formed by copolymerization, or a polymer blend formed by mixing. However, the polymer alloy does not include cases in which polymer particles such as polystyrene particles or polymethyl methacrylate particles are added.

In the present invention, the lower-content polymer of the polymers 1 and 2 of the polymer alloy is finely dispersed as small domains in the higher-content polymer. The difference in stretchability between the two different polymer domains is possibly reflected in biaxial orientation of the polymer alloy to uniformly form micro protrusions at a high density on the film surface.

The polyester (polymer 1) of the present invention is a polymer containing 70% or more by weight of polyester unit composed of an acid component such as an aromatic dicarboxylic acid, alicyclic dicarboxylic acid, aliphatic dicarboxylic acid, or the like, and a diol component.

Examples of aromatic dicarboxylic acids include terephthalic acid, isophthalic acid, phthalic acid, 1,4-naphthalenedicarboxylic acid, 1,5-naphthalenedicarboxylic acid, 2,6-naphthalenedicarboxylic acid, 4,4'-diphenyl dicarboxylic acid, 4,4'-diphenyl ether dicarboxylic acid, 4,4'-diphenyl sulfone dicarboxylic acid, and the like. Preferably, terephthalic acid, phthalic acid, and 2,6-naphthalenedicarboxylic acid can be used. As an alicyclic dicarboxylic acid, for example, cyclohexanedicarboxylic acid can be used. As an aliphatic dicarboxylic acid, for example, adipic acid, suberic acid, sebacic acid, dodecanedionic acid, and the like can be used. Preferably, terephthalic acid, and 2.6-naphthalenedicarboxylic acid can be used, and more preferably, terephthalic acid can be used. These acid components may be used singly or in combination of at least two acids.

Examples of diol components include ethylene glycol, 1,2-propanediol, 1,3-propanediol, neopentyl glycol, 1,3-butanediol, 1,4-butanediol, 1,5-pentanediol, 1,6-hexanediol, 1,2-cyclohexanedimethanol, 1,3-cyclohexanedimethanol, 1,4-cyclohexanedimethanol, diethylene glycol, triethylene glycol, polyalkylene glycol, 2,2'-bis (4'-β-hydroxyethoxyphenyl) propane, and the like. Preferably, ethylene glycol, 1,4-butanediol, 1,4-cyclohexanediol, and diethylene glycol can be used, and more preferably, ethylene glycol can be used. These diol components can be used singly or in combination of at least two components.

As the polyester (polymer 1) of the present invention, polyethylene terephthalate (PET), poly(ethylene-2,6-naphthalenedicarboxylate) (PEN) are preferably used, and polyethylene terephthalate (PET) is more preferably used from the viewpoint of melt moldability.

The polyester (polymer 1) may be further copolymerized with a multi-functional compound such as trimellitic acid, pyromellitic acid, glycerol, pentaerythritol, 2,4-dioxybenzoic acid, or the like, a monofunctional compound such as lauryl alcohol, phenyl isocyanate, or the like, an aromatic hydroxycarboxylic acid such as p-hydroxybenzoic acid, m-hydroxybenzoic acid, 2,6-hydroxynaphtoic acid, or the like, p-aminophenol, p-aminobenzoic acid, or the like in an amount which does not deteriorate the effect of the present invention.

The thermoplastic resin (polymer 2) of the present invention is a thermoplastic resin other than polyester. In use of polyester as the polymer 2, an effective difference in stretchability between both polymers during biaxial orientation occurs less possibly due to the similar thermal properties of the polymers, for example, the glass transition temperatures. The use of polyester as the polymer 2 is thus undesirable because micro protrusions are little produced by the polymers used in the present invention.

The polymer 2 of the present invention is preferably a polymer having a higher glass transition-temperature (Tg) than the polymer 1. With the polymer 2 having higher Tg, micro protrusions are easily formed in orientation, and the anti-chipping property of the micro protrusions tends to be improved.

The polymer 2 of the present invention preferably exhibits good affinity (compatibility) for the polymer 1. The good affinity (compatibility) means that for example, when an unstretched or biaxially stretched film is formed by using the polymer alloy composed of the polymers 1 and 2, and a section is observed under a transmission electron microscope with a magnification of ×30000 to 500000, a structure (for example, a poorly-dispersed polymer domain) having a diameter of 200 nm or more is not observed, which is not due to an additive such as additive particles. However, the method of deciding the affinity between the polymers 1 and 2 is not limited to this, and when a single glass transition temperature is observed in temperature-modulated DSC (MDSC), it may be decided that both polymers have good affinity according to demand.

As the polymer 2 of the present invention, polyimide (including polyetherimide), polysulfone, and polyethersulfone are preferably used from the viewpoint of exhibiting good affinity for polyester and producing the micro protrusions in biaxial orientation. These thermoplastic resins may be used singly or in combination of at least two resins.

A compatibilizer is preferably combined in order to control the dispersion diameter according to demand. In this case, the type of the compatibilizer used depends upon the type of the polymer used, but the amount of the compatibilizer added is preferably 0.01 to 10% by weight.

Although the polyimide used as the polymer 2 of the present invention is not limited as long as it exhibits good affinity for the polymer 1, for example, polyimide having a structural unit represented by the following formula is preferred.

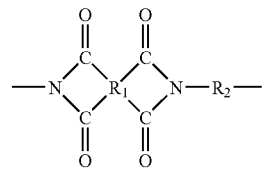

wherein $R_1$ represents at least one group selected from the aliphatic hydrocarbon groups, alicyclic hydrocarbon groups, and aromatic hydrocarbon groups given below.

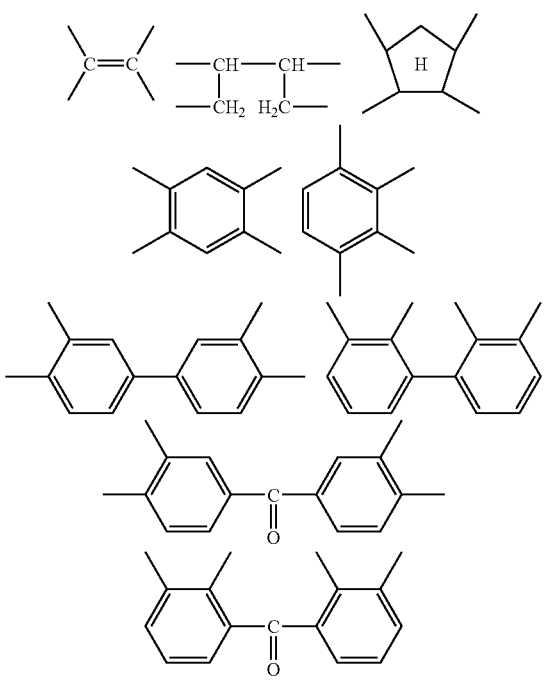

-continued
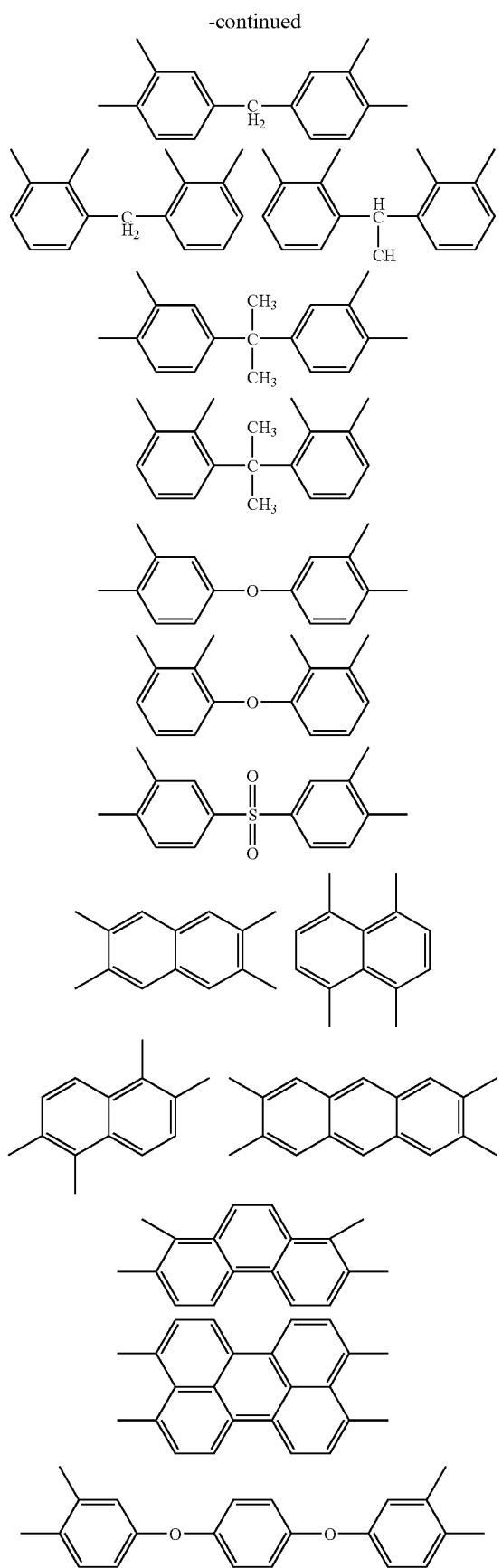
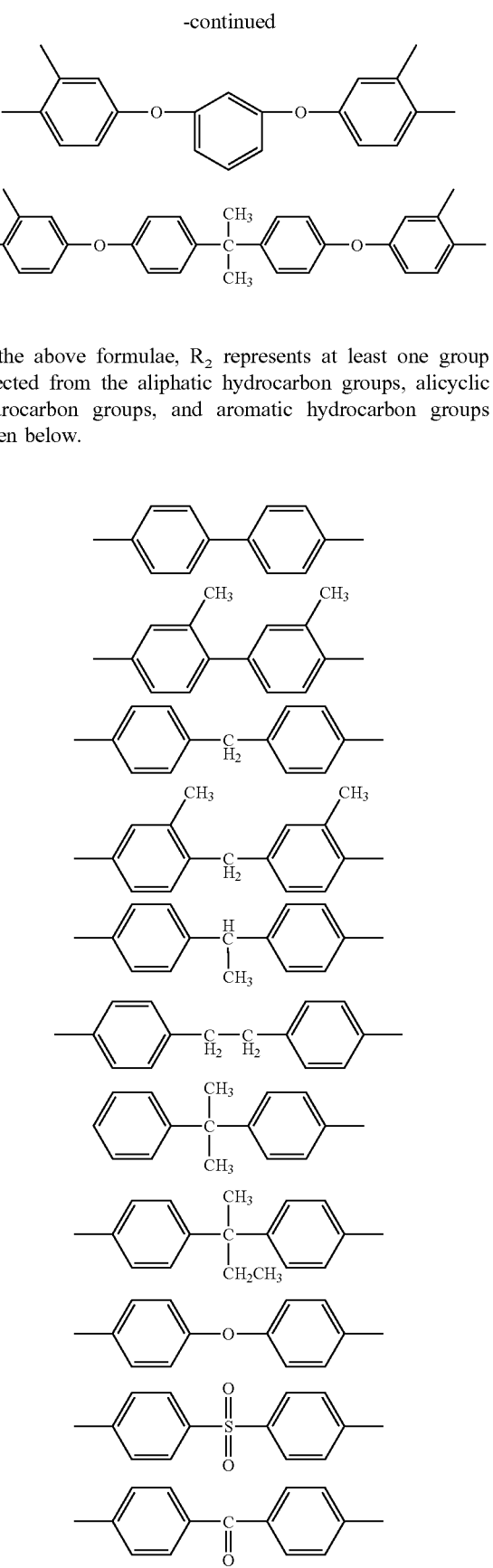
In the above formulae, $R_2$ represents at least one group selected from the aliphatic hydrocarbon groups, alicyclic hydrocarbon groups, and aromatic hydrocarbon groups given below.

-continued

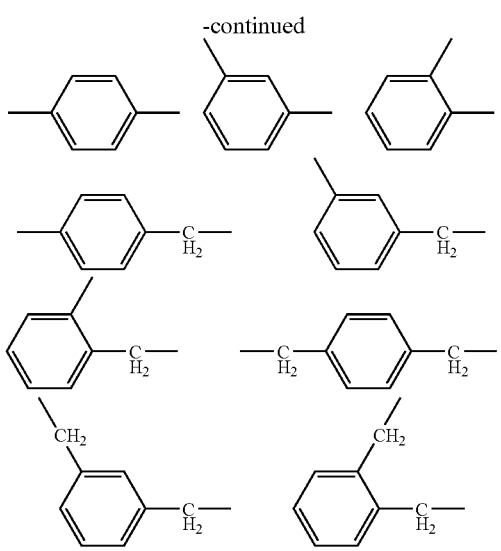

Such polyimide can be obtained by dehydration condensation of tetracarboxylic acid and/or acid anhydride thereof and at least one compound selected from the group consisting of aliphatic primary amines, aromatic primary amines, aliphatic primary diamines and aromatic primary diamines.

Examples of tetracarboxylic acid and acid anhydride thereof include ethylenetetracarboxylic acid, 1,2,3,4-butanetetracarboxylic acid, cyclopentanetetracarboxylic acid, pyromellitic acid, 1,2,3,4-benzenetetracarboxylic acid, 3,3', 4,4'-biphenyltetracarboxylic acid, 2,2',3,3'-biphenyltetracarboxylic acid, 3,3',4,4-benzophenonetetracarboxylic acid, 2,2',3,3' -benzophenonetetracarboxylic acid, bis (2,3-dicarboxyphenyl)methane, bis(3,4-dicarboxyphenyl)methane, 1,1'-bis(2,3-dicarboxyphenyl) ethane, 2,2'-bis (3,4-dicarboxyphenyl) propane, 2,2'-bis(2,3-dicarboxyphenyl)propane, bis(3,4-dicarboxyphenyl)ether, bis(2,3-dicarboxyphenyl) ether, bis(3,4-dicarboxyphenyl)sulfone, bis(2,3-carboxyphenyl)sulfone, 2,3,6,7-naphthalenetetracarboxylic acid, 1,4,5,8-naphthalenetetracarboxylic acid, 1,2,5,6-naphthalenetetracarboxylic acid, 2,3,6,7-anthracenetetracarboxylic acid, 1, 2, 7, 8-phenanthrenetetracarboxylic acid, 3,4,9, 10-perylenetetracarboxylic acid, 4,4'-(p-phenylenedioxy) diphthalic acid, 4,4'-(m-phenylenedioxy)diphthalic acid, 2,2'-bis[(2,3-dicarboxyphenoxy)phenyl]propane, and the like, and acid anhydrides thereof.

As an aliphatic primary monoamine, for example, a saturated or unsaturated straight chain, branched or alicyclic monoamine having 2 to 22 carbon atoms is used. Examples of such monoamines include ethylamine, butylamine, pentylamine, hexylamine, heptylamine, octylamine, nonylamine, undecylamine, dodecylamine, tridecylamine, tetradecylamine, pentadecylamine, hexadecylamine, heptadecylamine, octadecylamine, nonadecylamine, eicosylamine, heneicosylamine, docosylamine, cyclohexylamine, methylcyclohexylamine, dimethylcyclohexylamine, diethylcyclohexylamine, and structural isomers thereof.

As an aromatic primary monoamine, for example, primary aniline which is unsubstituted or substituted with alkyl having 1 to 22 carbon atoms is used. Examples of such monoamines include aniline, toluidine, ethylaniline, propylaniline, butylaniline, pentylaniline, hexylaniline, heptylaniline, octylaniline, nonylaniline, decylaniline, undecylaniline, dodecylaniline, tridecylaniline, tetradecylaniline, pentadecylaniline, hexadecylaniline, heptadecylaniline, octadecylaniline, nonadecylaniline, eicosylaniline, heneicosylaniline, docosylaniline, and structural isomers thereof.

As an aliphatic primary diamine, for example, primary diamine having a methylene bond having 1 to 12 carbon atoms, or diamine having an alicyclic group is used. Examples of such diamines include ethylenediamine, trimethylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, 1,3-bisaminocyclohexane, diaminodicyclohexylmethane, m-xylenediamine, and structural isomers thereof.

Examples of aromatic primary diamines benzidine, dimethylbenzidine, diaminodiphenylmethane, diaminoditrimethane, diaminodiphenylethane, diaminodiphenylpropane, diaminodiphenylbutane, diaminodiphenylether, diaminodiphenylsulfone, diaminodiphenylbenzophenone, o, m, p-phenylenediamine, tolylenediamine, xylenediamine, and aromatic primary diamines having these diamines as structural units.

From the viewpoints of melt moldability with polyester, the handling property, the property of forming surface protrusions, polyetherimide is preferred, which has a polyimide structural component having an ether bond represented by the following formula:

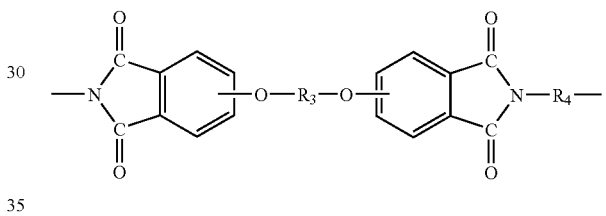

(wherein $R_3$ represents a bivalent aromatic or aliphatic residue having 6 to 30 carbon atoms, and $R_4$ represents a bivalent organic group selected from the group consisting of a bivalent organic residue having 6 to 30 carbon atoms, an alkylene group having 2 to 20 carbon atoms, a cycloalkylene group having 2 to 20 carbon atoms, and a polydiorganosiloxane group having a chain terminated with an alkylene group having 2 to 8 carbon atoms).

Examples of $R_3$ and $R_4$ include aromatic residues represented by the following formulae:

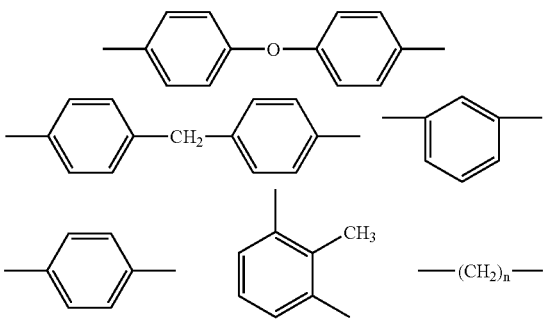

In the present invention, from the viewpoint of affinity for polyester (polymer 1), cost and melt moldability, a polymer which is a condensation product of 2,2-bis [4-(2,3-dicarboxyphenoxy)phenyl]propane dianhydride and m-phenylenediamine or p-phenylenediamine, and which has a repeating unit represented by the following formula, is preferred.

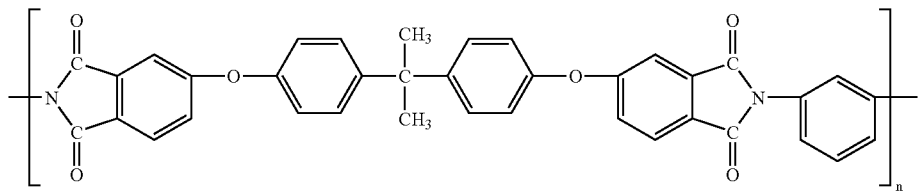

or

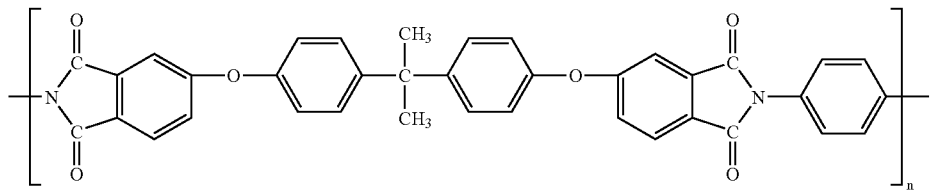

(wherein n is an integer of 2 or more, and preferably an integer of 20 to 50)

This polyetherimide can be obtained as the trade name "Ultem" (registered trademark) from G. E. Plastic Co., Ltd.

The polyethersulfone used as the polymer 2 of the present invention is a polymer having a repeating unit represented by the following formula, in which aromatic rings are bonded by a sulfonyl group, and one or two ether groups. However, this polymer may be copolymerized with another structural unit to some extent.

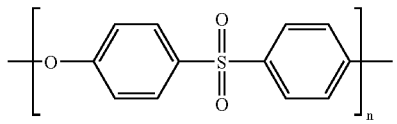

(n is an integer of 2 or more)

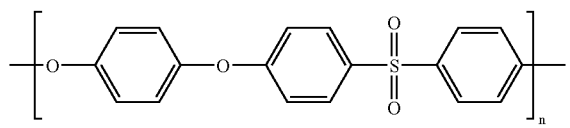

(n is an integer of 2 or more)

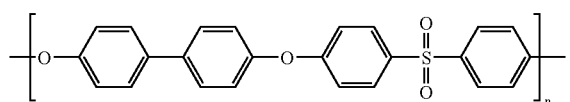

(n is an integer of 2 or more)

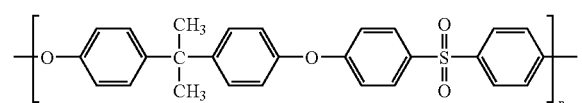

(n is an integer of 2 or more)

The affinity (compatibility) between the polymers 1 and 2 of the present invention greatly depends upon combinations of the polymers 1 and 2. Of the above-described combinations, a combination of polyethylene terephthalate and polyetherimide, a combination of polyethylene terephthalate and polysulfone, a combination of poly(ethylene-2,6-naphthalenedicarboxylate) and polyetherimide, a combination of poly(ethylene-2,6-naphthalenedicarboxylate) and polysulfone, and a combination of poly(ethylene-2,6-naphthalenedicarboxylate) and polyethersulfone exhibit preferred affinity. Particularly, from the viewpoints of melt moldability, stability of an alloy melt, and the protrusion forming performance in biaxial orientation, the combination of polyethylene terephthalate and polyetherimide is the most preferred example.

In the present invention, with respect to the time when the thermoplastic resin (polymer 2) is added to the polyester (polymer 1), the polymer 2 may be added before polymerization of the polymer 1, for example, before esterification reaction, or after polymerization. Alternatively, the polymers 1 and 2 may be mixed and pelletized before melt extrusion. In pelletizing, master pellets containing a high concentration (for example, 35 to 65% by weight, and preferably 40 to 60% by weight) of polymer 2 may be formed, and then further diluted with the polymer 1 to control the predetermined concentration. In some cases, this method improves dispersibility between the polymers, and exhibits a dispersed state preferable for the polymer alloy of the present invention.

Other examples of the method for controlling the polymer alloy of the present invention to a more preferable dispersed state include a method of mixing by using a tandem extruder, a method of finely dispersing the polymer 2 using at least two types of polyesters, a method of mixing the two polymers after the polymer 2 is powdered by a pulverizer, a method of mixing the two polymers by dissolving the polymers in a solvent and coprecipitating them, a method of mixing one of the polymers with a solution of the other polymer in a solvent, and the like. However, the method is not limited to these methods.

The biaxially oriented film of the present invention has micro protrusions having a height of 2 to 50 nm formed at a density of 1,000,000 to 90,000,000/mm$^2$ on at least one of the surfaces. The protrusions having a height of less than 2 nm are undesirable because they do not contribute to the traveling performance of the film due to the excessively low height. The protrusions having a height of over 50 nm are undesirable because they deteriorate the electromagnetic conversion property in use as a magnetic tape. The height of the protrusions is preferably 2 to 30 nm, more preferably 3 to 20 nm. The protrusions with a density of less than 1,000,000/mm$^2$ are undesirable because they cannot sufficiently contribute to improvement in the traveling performance, while the protrusions with a density of over 90,000,000/mm$^2$ are undesirable because they deteriorate the electromagnetic conversion property in use as a magnetic tape even when they are micro protrusions. The density of the protrusions is preferably 3,000,000 to 60,000,000/mm$^2$, more preferably 5,000,000 to 50,000,000/mm$^2$.

Furthermore, at least some of the surface protrusions of the biaxially oriented film of the present invention are due to the polymer alloy, not inert particles (additive particles or internal precipitated particles). Namely, some of the protrusions preferably comprise the polymer 1 or polymer 2. More preferably, 30% or more, more preferably 60% or more, of the protrusions are due to the polymer alloy.

In the present invention, the inert particles mean inorganic or organic particles having an average particle diameter of about 10 nm to 1 μm, causing no chemical reaction in the polymers of the present invention, and having no adverse electromagnetic effect on magnetic recording. Examples of the inert particles include inorganic particles of titanium oxide, calcium carbonate, kaolin, talc, wet or dry silica, colloidal silica, calcium phosphate, barium sulfate, alumina, zirconia, and the like, organic particles comprising components such as acrylic acids, styrene, silicone, imide, and the like, particles (so-called internal particles) precipitated by a catalyst added at the time of polyester polymerization, a surfactant, and the like.

Although the detailed mechanism of formation of the protrusions due to the polymer alloy is not known, the protrusions are possibly formed due to the occurrence of unevenness which is caused by the difference in stretchability between the polymers 1 and 2 during biaxial orientation of the polymer alloy. In forming the many protrusions by using the inert particles, coarse particles are inevitably formed due to aggregation, and undesirably cause deterioration in the electromagnetic conversion property, dropout, deterioration in durability of a magnetic head, etc. The protrusions due to the polymer alloy possibly exhibit good affinity between the polymer constituting the protrusions and the peripheral polymer, and are thus preferred because they are less chipped during traveling in the film forming and processing steps and in forming a magnetic tape, and have high abrasion resistance, as compared with the protrusions due to the inert particles. In order to decide whether or not the surface protrusions are due to the polymer alloy, for example, a method is used, in which the object protrusions are etched with an appropriate solvent in the thickness direction of the film, and when the material causing the protrusions remains as an insoluble material, the protrusions are due to the inert particles, while when such a material does not remain, the protrusions are due to the polymer alloy. Another method comprises observing a section of the surface layer of the film under a transmission electron microscope with a magnification of x100000 to 500000, and deciding that the protrusions are due to the polymer alloy when the inert particles are not observed up to a certain depth from the protrusions. However, the method is not limited to these methods, and at least two methods may be combined.

In the biaxially oriented film of the present invention, the coarse protrusions having a height of over 50 nm are preferably present with a density of 3000/mm$^2$ or less on the surface on which the micro protrusions are formed. The density of the coarse protrusions having a height of over 30 nm are more preferably 3000/mm$^2$ or less. The density of the coarse protrusions is preferably 1500/mm$^2$ or less, more preferably 500/mm$^2$ or less. This is because in use as the magnetic tape, the coarse protrusions having a height of over 50 nm deteriorate not only the electromagnetic conversion property but also the traveling durability of a drive due to damage to the magnetic head. When a MR head is used as the magnetic head, this tendency becomes significant.

The content of the polymer 2 in the polymer alloy is preferably in the range of 5 to 50% by weight, more preferably in the range of 5 to 40% by weight, most preferably in the range of 25 to 40% by weight. With the content of the polymer 2 of less than 5% by weight, fine dispersion cannot be sufficiently performed by an extruder because the melt viscosity of the polymer 1 is generally greatly different from the polymer 2, and thus the domains of the polymer 2 become coarse to coarsen the surface protrusions in some cases. Conversely, when fine dispersion can be performed by kneading, the domains become excessively small due to the low content to fail to form the protrusions of an effective size, i.e., the preferred surface protrusions. With the content of the polymer 2 of over 50% by weight, extrusion molding and orientation processing are difficult to cause troubles in film formation and processing, such as film breakage and die lines during extrusion, and the domains of the polymer 2 due to fine dispersion or micro phase separation become excessively large to coarsen the protrusions.

The biaxially oriented film of the present invention may comprise a single layer, but preferably has a laminated structure comprising at least two layers including a film layer (referred to as "A layer") having the micro protrusions of the present invention and used as the outermost layer in order to simultaneously impart different properties, i.e., the good film traveling performance or winding performance, and the good electromagnetic conversion property, to the film. Namely, in the film, the A layer is laminated on at least one outermost layer of a base layer (referred to as "B layer"), and the micro protrusions of the present invention are formed on the surface of the A layer. The A layer of the biaxially oriented film of the present invention is a film layer having a flat surface which is used as a magnetic surface in use for a magnetic recording medium. The base layer (B layer) is generally a thickest layer in the film, and mainly functions to maintain strength and dimensional stability. In a two-layer lamination, a relatively rough surface can be provided on the B layer to obtain the good traveling property. In this case, the polymer used in the base layer is preferably polyester (polymer 1) used in the A layer, or the polymer alloy of the polymer 1 used in the A layer and the polymer 2 used in the A layer. However, that polymer is not limited to these polymers. When the A layer and B layer contain the same polyester (polymer 1), in stretching a laminated film of the B layer and A layer, the polyesters (polymer 1) of the B and A layers can be stretched under same conditions in the same manner. Therefore, the domains of the polyester (polymer 1) present in the A layer due to fine dispersion or micro phase separation are easily stretched to easily express the difference in stretchability between the polyester (polymer 1) and the thermoplastic resin (polymer 2), thereby easily forming the surface protrusions. In this case, the A layer preferably has a thickness of 20% or less of the total thickness of the film because the film forming property is good and the effect of the present invention is further improved. The A layer more preferably has a thickness of 15% or less, most preferably 10% or less, of the total thickness of the film. In the laminated film, the thickness of the A layer is preferably 0.01 to 5 µm because the film forming property is good and the effect of the present invention is further improved. The thickness of the A layer is more preferably 0.03 to 2 µm, most preferably 0.05 to 1 µm.

In the laminated structure, the A layer causing less bleed out of oligomers is laminated to obtain the good property of suppressing the oligomers produced from the B layer.

In the laminated structure, the content $W_A$ by weight of the polymer 2 in the A layer and the content $W_B$ of the polymer 2 in the B layer preferably satisfy the following relationships:

$0 \leq W_B \leq 40$, $5 \leq W_A \leq 50$, $10 \leq W_A - W_B \leq 40$, more preferably;

$0 \leq W_B \leq 25$, $25 \leq W_A \leq 50$, $10 \leq W_A - W_B \leq 40$.

In the laminated structure, with the base layer (B layer) comprising the polymer 2 having a content of over 40% by weight, the moldability deteriorates to cause troubles in film formation and processing, for example, film breakage and the like. In a case in which the difference between the content of the polymer 2 in the A layer and the content of the polymer 2 in the base layer is less than 10% by weight, the difference in stretchability between the domains of the polymers 1 and 2 in the A layer is less exhibited, thereby causing difficulties in forming the surface protrusions of the present invention. In a case in which the difference between the content of the polymer 2 in the A layer and the content of the polymer 2 in the base layer exceeds 40% by weight, uniform lamination cannot be easily performed in co-extrusion because of the great difference between the melt viscosities of the base layer polymer and the laminated polymer, thereby causing troubles in film formation and processing, for example, a difficulty in uniform lamination.

With the A layer containing substantially no inert particle, the micro protrusions are uniformly formed with less coarse protrusions to cause, particularly, the good electromagnetic conversion property, and less damage to the magnetic head. In this case, "containing substantially no inert particle" means the case in which the A layer contains no inert particle, or even when the A layer contains inert particles, the average particle diameter is 10 nm or less, or the content of the inert particles is 0.001% by weight or less.

The A layer may contains a small amount of inert particles. In this case, the lubricity, abrasion resistance and scratch resistance of the film surface, and the like are improved. In the film having the laminated structure of at least 2 layers, when the A layer contains the inert particles, particularly, the resistance to edge damage is improved. However, there are the disadvantages that the electromagnetic conversion property deteriorates, and the magnetic head is easily damaged, as compared with the case in which the A layer contains no inert particle. In this case, as the inert particles added to the A layer, the above-described inert particles can be used. The inert particles may comprise one type of particles or a combination of at least two types of particles. In use for a magnetic recording medium, the average diameter d of the inert particles is preferably 0.01 to 2 µm, more preferably 0.01 to 1 µm. From the viewpoint of the resistance to edge damage, the content of the inert particles is 0.001 to 2% by weight, preferably 0.01 to 1% by weight. In this case, the thickness t of the A layer is 0.1 to 10 times, more preferably 0.2 to 5 times, as large as the average diameter d.

In order to improve the abrasion resistance, the traveling performance and the handling property, the inert particles are preferably added to the B layer. However, the amount of the inert particles added is preferably as small as possible in order to prevent the occurrence of coarse protrusions due to the added particles, and transcription to the A layer. In adding the inert particles, the amount of the inert particles added is preferably 0.001 to 10% by weight, and the average particle diameter is preferably 1 nm to 1 µM.

The most preferred laminated structure of the biaxially oriented film of the present invention is a laminated structure comprising at least three layers, i.e., A layer/B layer/C layer, in which different films are laminated on both sides of the base layer (B layer). Namely, the A layer is laminated as one of the outermost layers of the base layer (referred to as the "B layer"), and the C layer is laminated as the opposite outermost layer, the micro protrusions being formed on the surface of the A layer. In the laminated structure comprising the two layers of A layer/B layer, the B layer preferably contains the inert particles having a relatively large average particle diameter in order to obtain the traveling performance and handing property, as described above. However, with the A layer comprising a thin film, the surface of the A layer is roughened by the influence of the inert particles in the B layer, thereby deteriorating the electromagnetic conversion property in some cases. On the other hand, in the laminated structure comprising the three layers of A layer/B layer/C layer, the base layer (B layer) is a smooth layer containing substantially no inert particle, and the C layer contains the inert particles to have a relatively rough surface as the traveling surface. In this case, the smooth base layer (B layer) held between the A and C layers prevents the surface of the A layer from being roughened by the influence of the inert particles in the C layer, thereby satisfying both the electromagnetic conversion property and the traveling performance at a high level in use as a magnetic tape.

The amount of the inert particles added to the C layer is preferably 0.001 to 10% by weight, and the average particle diameter is preferably 1 nm to 1 µm.

In the biaxially oriented film of the present invention having the laminated structure comprising the three layers of A layer/B layer/C layer, the surface roughness $Ra_A$ Of the A layer is preferably 0.2 to 10 nm, more preferably 0.5 to 5 nm, most preferably 1 to 3 nm. With the A layer having a surface roughness $Ra_A$ of less than 0.2 nm, the friction with the rolls used in the film formation step and processing step is significantly increased to easily cause damage, and deteriorate the traveling performance for the magnetic head in use as the magnetic tape. With the A layer having a surface roughness $Ra_A$ Of over 10 nm, the electromagnetic conversion property deteriorates in use as the magnetic tape, and thus the biaxially oriented film is unsuitable for a high-density magnetic recording medium in some cases.

The surface roughness $Ra_C$ of the C layer is preferably higher than the surface roughness $Ra_A$ of the A layer. With the C layer having surface roughness $Ra_C$ lower than the surface roughness $Ra_A$ of the A layer, the frictional coefficients of both surfaces of the film are significantly increased to deteriorate the handling property such as a traveling performance in the film formation and processing steps, thereby causing difficulties in winding in a roll.

The surface roughness $Ra_C$ of the C layer is preferably 1 to 30 nm, more preferably 5 to 15 nm, most preferably 6 to 10 nm. With the C layer having a surface roughness $Ra_C$ of less than 15 nm, the handling property such as the traveling performance deteriorates in the film formation and processing steps, and the traveling performance for a guide pin deteriorates in use as the magnetic tape. With the C layer having a surface roughness Rac of over 30 nm, the form of the protrusions is transferred to the flat A layer side opposite to the C layer during winding in a roll, thereby roughening the A layer in some cases.

The thickness of the C layer is preferably 0.01 to 2 μm, more preferably 0.1 to 1.5 am, most preferably 0.2 to 1 μm.

The biaxially oriented film of the present invention may further contains a heat stabilizer, an antioxidant, an ultraviolet absorber, an antistatic agent, a fire retardant, a pigment, a dye, a fatty acid ester, an organic solvent such as wax, and the like in a range which does not interfere with the present invention.

The total of the Young's modulus in the longitudinal direction and the Young's modulus in the transverse direction of the biaxially oriented film of the present invention is preferably in the range of 10 to 25 GPa, more preferably in the range of 12 to 22 GPa, most preferably 14 to 20 GPa. With the total Young's modulus of less than 10 GPa, for example, in use for a magnetic recording medium, the magnetic tape is elongated due to the tension in traveling, which is caused by the magnetic recording head and guide pin, and the electromagnetic conversion property (output property) is adversely affected to make the tape unendurable to practical use. With the total Young's modulus of over 25 GPa, the film cannot be easily produced by an industrial method, and the tear resistance and dimensional stability of the film deteriorate in some cases.

The heat shrinkage ratio of the biaxially oriented film of the present invention in at least one of the longitudinal direction and the transverse direction at 100 c for 30 minutes is preferably 0.01 to 2.0% from the viewpoint of elongation deformability and the storing property of the tape. The heat shrinkage ratio is more preferably 0.01 to 1.5%, most preferably 0.10 to 1.0%. With a heat shrinkage ratio of over 2.0%, the dimensional stability deteriorates in some cases. For example, in use for the magnetic recording medium, the tape is easily thermally deformed by heating of the magnetic head due to heat history in the film processing step of coating a magnetic layer on the base film, and heat of friction between the magnetic tape and the magnetic recording head, the surface durability of the film deteriorates, or the storing property of the tape deteriorates. With the heat shrinkage ratio of less than 0.01%, the film is expanded to cause wrinkles.

From the viewpoint of stability of film processing and the mixing property with the thermoplastic resin, the intrinsic viscosity of the polymer alloy comprising the polymers 1 and 2 of the present invention is preferably in the range of 0.55 to 3.0 (dl/g), more preferably 0.60 to 2.0 (dl/g). From the viewpoint of stability of film processing and dimensional stability, the intrinsic viscosity of the film is preferably in the range of 0.50 to 2.0 (dl/g), more preferably 0.55 to 1.0 (dl/g).

The biaxially oriented film of the present invention is preferably used for a magnetic recording material, a capacitor, a thermosensitive transfer ribbon, a thermosensitive stencil printing plate base paper, etc. Particularly, the film is preferably used for a magnetic recording medium for data storage or the like, which is required to have a uniform fine surface. In use for the magnetic recording medium, the film is suitable for a high-density magnetic recording tape, for example, a data storage base film. The recording capacity of the data storage film is preferably 30 GB (gigabyte) or more, more preferably 70 GB or more, most preferably 100 GB or more.

The thickness of the biaxially oriented film of the present invention is preferably 1000 μm or less, more preferably in the range of 0.5 to 500 μm. Although the thickness of the film is appropriately determined according to the application and purpose, the thickness is generally 1 to 15 μm for a magnetic recording medium, 2 to 10 μm for data or digital video metal powder-type magnetic recording medium, and 3 to 9 μm for a data or digital video metal evaporated-type magnetic recording medium. The film having a thickness of 0.5 to 15 μm is preferably used for a capacitor, exhibiting excellent breakdown voltage and dielectric properties. The film having a thickness of 1 to 6 μm is preferably used for a heat transfer ribbon, permitting high-definition printing without causing wrinkles and unevenness in printing and over-transfer of ink. The film having a thickness of 0.5 to 5 μm is preferably used for thermosensitive stencil printing plate base paper, exhibiting excellent perforation ability with low energy, permitting a change in diameter of the perforated hole according to the energy level, and exhibiting excellent printability in color printing using a plurality of plates.

In the biaxially oriented film of the present invention, another polymer layer, for example, of polyolefin, polyamide, polyvinylidene chloride or acrylic polymer, may be further laminated directly or with an adhesive layer or the like provided therebetween.

The biaxially oriented film of the present invention may be subjected to any desired processing such as heat treatment, molding, surface treatment, lamination, coating, printing, embossing, etching, etc.

By providing a magnetic layer on at least one side of the biaxially oriented film of the present invention, the film can be used as a magnetic recording medium. Although the magnetic layer may be provided on any one or both sides of the film, the magnetic layer is preferably provided on the A layer side in use of the laminated structure film.

Preferred examples of the magnetic layer include a magnetic layer comprising a ferromagnetic metal thin film, a magnetic layer comprising a ferromagnetic metal fine powder dispersed in a binder, a magnetic layer coated with a metal oxide, and the like. Preferred examples of metals which can be used for the ferromagnetic metal thin film include iron, cobalt, nickel, alloys thereof, and the like. As the ferromagnetic metal fine powder used for the magnetic layer comprising the ferromagnetic metal fine powder dispersed in the binder, a ferromagnetic hexagonal ferrite fine powder, a powder of iron, cobalt, nickel, or an alloy thereof, is preferably used. As the binder, a thermoplastic resin, a thermosetting resin, a reactive resin, or a mixture thereof is preferably used.

As the method of forming the magnetic layer, a coating method comprising mixing a magnetic powder with a thermosetting, thermoplastic or radiation curable binder, coating the resultant mixture, and the drying the coating, or a dry method comprising forming a magnetic metal thin film layer directly on the base film by evaporation, sputtering or ion plating of a metal or an alloy can be used.

In the magnetic recording medium of the present invention, a protecting film may be provided on the magnetic layer. The protecting film can further improve traveling durability and corrosion resistance. Examples of the protecting film include an oxide protecting film made of silica, alumina, titania, zirconia, cobalt oxide, nickel oxide, or the like, a nitride protecting film made of titanium nitride, silicon nitride, boron nitride, or the like, a carbide protecting film made of silicon carbide, chromium carbide, boron carbide, or the like, a carbon protecting film made of graphite, amorphous carbon, or the like.

The carbon protecting film comprises a carbon film comprising an amorphous, graphite or diamond structure, or a mixture thereof formed by a plasma CVD or sputtering process, and preferably comprises a film of hard carbon generally referred to as "diamond-like carbon".

In order to improve adhesion to a lubricant applied to the hard carbon protecting film, the surface of the hard carbon protecting film may be treated with oxidizing or inert gas plasma.

In the present invention, in order to improve the traveling durability and corrosion resistance of the magnetic recording medium, a lubricant and an antirust agent may be preferably applied to the magnetic layer or the protecting film.

In the method of producing the biaxially oriented film of the present invention, a melted polymer is preferably discharged from a die of an extruder for melt extrusion, and solidified by cooling to form a sheet. The sheet-shaped molding is preferably stretched 1 to 10 times in the longitudinal direction and 1 to 10 times in the transverse direction, and then heat-set at a temperature of 150 to 250° C.

The more preferable method comprises stretching by 2 to 9 times in the longitudinal direction and 2 to 9 times in the transverse direction, and heat-set at 170 to 230° C., and the most preferable method comprises stretching by 3 to 8 times in the longitudinal direction and 3 to 8 times in the transverse direction, and heat treatment at 180 to 220° C.

Examples of the stretching method for the biaxially oriented film of the present invention include a successive biaxial stretching method comprising stretching in the longitudinal direction and then stretching in the transverse direction, a simultaneous biaxial stretching method comprising simultaneously stretching in the longitudinal direction and the transverse direction by using a simultaneous biaxial tenter or the like, a combination of the successive biaxial stretching method and the simultaneous biaxial stretching method, and the like.

Although an example of the method of producing the biaxially oriented film of the present invention is described below, the method is not limited to this example. This example uses a laminated film comprising polyethylene terephthalate used as the polymer 1 of the A layer, and polyetherimide "Ultem" used as the polymer 2 of the A layer. The production conditions depend upon the polymer 1 and polymer 2 used, and the laminated structure.

First, esterification of terephthalic acid and ethylene glycol, or ester exchange reaction of dimethyl terephthalate and ethylene glycol is effected according to a conventional method to obtain bis-β-hydroxyethyl terephthalate (BHT). Next, BHT is transferred to a polymerization reactor in which polymerization reaction proceeds under heating at 280° C. and vacuum. As a result, polyester having a intrinsic viscosity of about 0.5 is obtained. The resultant polyester is pelletized, and brought into a state under reduced pressure to effect solid-state polymerization. In solid-state polymerization, the polyester pellets are previously crystallized at a temperature of 180° C. or lower, and then subjected to solid-state polymerization at 190 to 250° C. and a reduced pressure of about 1 mmHg for 10 to 50 hours. When the inert particles are contained in the polyester constituting the film, preferably, the inert particles are dispersed at a predetermined ratio in a slurry form in ethylene glycol, and the ethylene glycol is added during polymerization. In adding the inert particles to polyester, for example, water sol or alcohol sol of the inert particles obtained at the time of synthesis is preferably added without drying, exhibiting excellent dispersibility. It is also effective that a water slurry of the inert particles is mixed directly with the polyester pellets, and then kneaded with polyester by using a vent-type biaxial kneading extruder. An effective method for adjusting the content of the inert particles is a method in which a high-concentration inert particle master is formed by the above-described method, and then diluted with polyester containing substantially no inert particle during film formation to control the content of the inert particles.

Next, the pellets of polyethylene terephthalate and pellets of polyetherimide are mixed at a predetermined ratio, and the resultant mixture is supplied to the vent-type biaxial kneading extruder for melt extrusion. At this time, the shear rate is preferably 50 to 300 sec$^{-1}$, and more preferably 100 to 200 sec$^{-1}$, and the stagnation time is preferably 0.5 to 10 minutes, and more preferably 1 to 5 minutes. When the both materials are not made compatible with each other under the above conditions, the obtained chips are again put into the biaxial extruder, and extrusion is repeated until both materials are compatible with each other.

The thus-obtained polyester pellets containing polyetherimide are dried at 180° C. under vacuum for 3 hours or more, supplied to the extruder heated to 280 to 320° C. under a nitrogen stream or vacuum so as to prevent a decrease in intrinsic viscosity, extruded from a slit die, and then cooled on a casting roll to obtain an unstretched film. In this extrusion, any of various filters such as a filter made of a material, for example, such as sintered metal, porous ceramic, sand, a metal net, or the like is preferably used for removing foreign materials and deteriorated polymers. If required, a gear pump may be provided for improving the constant feeding performance. For the laminated structure, a plurality of different polymers may be co-extruded by using at least two extruders and a manifold or a combined block.

Next, the unstretched film is biaxially stretched to be biaxially oriented. As the stretching method, the successive biaxial stretching method or simultaneous stretching method can be used. In this example, the successive biaxial stretching method comprising stretching in the longitudinal direction and then stretching in the transverse direction is used. Although the stretching —O temperature depends upon the components of the lamination, description will be made of a three-layer structure as an example in which the intermediate layer comprises polyethylene terephthalate and has a thickness of 80% or more of the total thickness of the film, and each of the outermost layers on both sides comprises a mixture of polyethylene terephthalate and polyetherimide. The unstretched film is heated by a group of heating rolls at 80 to 150° C. to be stretched 1 to 10 times in the longitudinal direction in a one step or multiple steps, and then cooled by a group of cooling rolls at 20 to 50° C. The stretching rate in the longitudinal direction is preferably in the range of 1000 to 50000%/min. Then, stretching in the transverse direction is performed. As the method of stretching in the transverse direction, for example, a method using a tenter is generally used. The stretching in the transverse direction is preferably performed at a ratio of 1 to 20 times, a stretching rate of 1000 to 20000%/min, and a temperature in the range of 80 to 150° C. If required, longitudinal stretching and/or lateral stretching is again performed. In this case, stretching in the longitudinal direction is preferably performed at a temperature of 80 to 180° C. and a stretch ratio of 1.1 to 2.0 times, and stretching in the transverse direction is preferably performed by using a tenter at a temperature of 80 to 180° C. and a stretch ratio of 1.1 to 2.0 times. The total ratio of stretch is preferably 1 to 10 times in the longitudinal direction and 1 to 10 times in the transverse direction. The total ratio of stretch is more preferably 2 to 9 times in the longitudinal direction and 2 to 9 times in the transverse direction, most preferably 3 to 8 times in the longitudinal direction and 3 to 8 times in the transverse direction. Then, the stretched film is heat-set under tension or relaxation in the transverse direction. In this case, the heat-set temperature is 150 to 250° C., preferably 170 to 230° C., more preferably 180 to 220° C., and the time is preferably in the range of 0.2 to 30 seconds.

[Method of Measuring Physical Properties and Method of Evaluating Effect]

(1) Height of Surface Protrusions and Number of Protrusions

Measurement is performed 10 times by using an atomic force microscope (AFM) in different portions under the following conditions.

Apparatus: NanoScope III AFM (produced by Digital Instruments Co.)
Cantilever: Silicon single crystal
Scanning mode: Tapping mode
Scanning range: 5 μm×5 μm
Scanning rate: 0.5 Hz
Measurement environment: temperature 25° C., relative humidity 55%

The number of protrusions in the range from the base plane to a height of 2 to 50 nm is measured, and the ten measurements are averaged and converted to a number of protrusions per $mm^2$. At the same time, the number of protrusions in the range from the flat surface to a height of 2 to 30 nm is measured, and converted to a number of protrusions per $mm^2$.

At the same time, the number of protrusions having a height of 30 nm or more, and the number of protrusions having a height of 50 nm or more are measured, and converted to numbers of protrusions per $mm^2$. In this case, the scanning range is 30 μm×30 μm. However, the scanning range is changed according to demand.

(2) Average Particle Diameter of Inert Particles

A cross section of a film is observed under a transmission electron microscope (TEM) with a magnification of x100000 or more. The thickness of a section for TEM is about 100 nm, and measurement is performed in 100 different fields of view or more. The weight average of the measured diameters corresponding to equivalent circles is considered as the average particle diameter d of the inert particles.

(3) Content of Polymer 1, Polymer 2 and Inert Particles

The polymer 1 and polymer 2 are dissolved in an appropriate solvent which dissolve both polymers, and a $^1$HNMR (nuclear magnetic resonance) spectrum is measured. Although the appropriate solvent depends upon the polymer type, for example, hexafluoroisopropanol (HFIP)/deuterated chloroform is used. In the obtained spectrum, the integrated intensity of each of the absorption peaks peculiar to the polymer 1 and polymer 2 (for example, absorption of the aromatic protons of terephthalic acid of PET, or absorption of the aromatic protons of bisphenol A of PEI) is determined, and the molar ratio of the polymer 1 to the polymer 2 is calculated by the intensity ratio and the number of protons. Furthermore, the ratio by weight is calculated by a formula weight corresponding to the unit of each of the polymers. The measurement conditions are, for example, as follows. However, the conditions depend upon the polymer type, and are not limited to these conditions.

Apparatus: BRUKER DRX-500 (Bruker Co.)
Solvent: HFIP/deuterated chloroform
Measurement frequency: 499.8 MHz
Reference: TMS (tetramethylsilane) (0 ppm)
Measurement temperature: 30° C.
Observation width: 10 KHz
Data points: 64 K
Acquisition time: 4.952 seconds
Pulse delay time: 3.048 seconds
Number of times of integration: 256

If required, composition analysis may be performed by FT-IR microscopy (Fourier transform microscopic infrared spectroscopy). In this case, composition analysis is performed by the ratio of a peak due to carbonyl groups of polyester to a peak due to another material. In order to covert the peak height ratio to a weight ratio, a calibration curve is previously formed by using samples having predetermined weight ratios, and the ratio of polyester to the total amount of polyester and the other material is determined. The PEI ratio is determined by the polyester ratio and the content of the inert particles. If required, a X-ray micro-analyzer may be used.

With respect to the content of the inert particles, a solvent which dissolves the polymers 1 and 2, but does not dissolve the inert particles is selected, and the polymers 1 and 2 are dissolved in the selected solvent. The inert particles are centrifuged to determine the percentage by weight.

(4) Thickness of Laminated Layer

A cross section of a film is observed by a superthin sectioning method ($RuO_4$ staining) using a transmission electron microscope (H-600 model, produced by Hitachi) at an acceleration voltage of 100 kV. The thickness of each layer is determined by the observation results of the interface. The magnification is appropriately selected according to the thickness of the laminated layer to be determined. The magnification is preferably x10,000 to x100,000.

The thickness can be measured by using a secondary ion mass spectroscope (SIMS). The concentration ratio (M+/C+) of the element due to the high concentration particles (or PEI) of the inert particles in the range from the surface layer to a depth of 3000 nm of the film and the carbon element of polyester are measured by SIMS from the surface to a depth of 3000 nm in the thickness direction.

The concentration of the element due to the inert particles (or PEI) is low at the surface layer, and gradually increases in the direction away from the surface. In the film of the present invention, the concentration of the element due to the inert particles (or PEI) becomes a maximum, and then decreases. In this concentration distribution curve, the depth where the concentration of the element due to the inert particles (or PEI) decreases to ½ of the maximum is considered as the lamination thickness.

The conditions are as follows:
i) Measurement apparatus
Secondary ion mass spectroscope (SIMS)
A-DIDA3000 produced by West Germany ATOMIKA Co.
ii) Measurement conditions
Primary ion species: $O_2$+
Primary ion acceleration voltage: 12 kV
Primary ion current: 200 nA
Luster region: 400 μm□
Analysis region: Gate 30%
Degree of Measurement vacuum: $5.0 \times 10^{-9}$ Torr
E-GUN: 0.5 KV–3.0 A When the inert particles contained at the highest content in the region from the surface layer to a depth of 3000 nm are organic polymer particles, SIMS measurement is difficult, and thus the surface is etched in measurement of the same depth profile as the above by XPS (X-ray photoelectron spectroscopy), IR (infrared spectroscopy), or the like to determine the lamination thickness.

(5) Young's Modulus

Measurement is performed by using an Instron-type tensilometer according to the method defined by ASTM-D882. The measurement conditions are as follows:

Measurement apparatus: Film strength and elongation automatic measuring device "Tensilon AMF/RTA-100" produced by Orientech Co., Ltd.

Sample size: 10 mm wide×100 mm long

Tensile rate: 200 mm/min

Measurement environment: temperature 23° C., humidity 65%

(6) Heat Shrinkage Ratio Measurement is performed according to JIS C2318.

Sample size: width 10 mm, gauge length 200 mm

Measurement condition: temperature 100° C., treatment time 30 minutes, no-load state A heat shrinkage ratio at 100° C. is determined by the following equation:

Heat shrinkage ratio (%)=[(Lo−L)/L$_o$]×100

L$_o$: Gauge length before heating

L: Gauge length after heating (7) Electromagnetic Conversion Property of Magnetic Tape An evaporated film of a cobalt/nickel alloy (20% by weight Ni) having a thickness of 200 nm is provided on the film of the present invention by using a continuous vacuum evaporation apparatus in the presence of a small amount of oxygen. Furthermore, a carbon protecting film is formed on the surface of the evaporated layer by a conventional method, and then slit with a width of 8 mm to form a pancake. Next, a portion having a length of 200 m of the pancake is set in a cassette to form a cassette tape.

The video S/N ratio is determined by using a commercial Hi8 VTR. In measurement of the S/N ratio, a signal is =supplied from a TV test signal generator, and compared with 0 decibel (dB) of a commercial standard Hi8ME tape by using a video noise meter. The traveling conditions include 25° C. and 60% RH.

In comparison with the electromagnetic conversion property of the commercial Hi8Me tape, when the ratio is 0 dB or more, the tape is a sufficiently practicable level as a digital recording system VTR tape. Evaluation is performed based on the following criteria:

+3 dB or more: 0

Sufficiently practicable level as a data storage magnetic recording medium.

0 dB or more and less than +3 dB: A

Sufficiently practicable level as a digital recording system VTR tape.

Less than 0 dB: x

Insufficient level as a recording system VTR tape.

(8) Dropout

The number of dropouts (DO) is determined by using the above-described cassette tape and a commercial digital video tape recorder with a built-in camera (DVC).

The number of dropouts (DO) is measured by measuring the number of block mosaics produced in a display by reproduction for 1 minute after a picture was recorded on the DVC tape of the present invention by using a commercial digital video tape recorder with a built-in camera. The traveling conditions include 25° C. and 60% RH.

30 dropouts or less: ○

Sufficiently practicable level as a data storage magnetic recording medium.

30 to 50 dropouts: Δ

Sufficiently practicable level as a digital recording system VTR tape.

51 dropouts or more: x

Insufficient level as a digital recording system VTR tape.

(9) Traveling Durability of Magnetic Tape

The above cassette tape is traveled 200 times at 25° C. and 60% RH, and then the S/N ratio and the DO number is measured. Evaluation is performed on the basis of the following criteria:

○:

A reduction in S/N is 1 dB or less, and an increase in the dropout number is 30 or less.

Δ:

A reduction in S/N is 2 dB or less, and an increase in the dropout number is 50 or less.

x:

A reduction in S/N is 2 dB or more, or an increase in the dropout number is 50 or more.

(10) Friction Coefficient μK (Head Traveling Performance)

A tape of ½ inch wide obtained by slitting the film was traveled by using a tape traveling performance tester TGT-300 model (produced by Yokohama System Kenkyusho Co., Ltd.) at 60° C. and 80% RH to determine the initial friction coefficient by the following equation (the film width is ½ inch). The surface on the A layer side is measured.

$$K=(2/\pi) \ln (T_2/T_1)$$

wherein $T_1$ is the inlet side tension, and $T_2$ is the outlet side tension. The guide diameter is 6 mmØ, the guide material is SUS27 (surface roughness 0.2 S), the winding angle is 90°, and the traveling speed is 3.3 cm/sec. When the measured μK of the film in the longitudinal direction is 0.7 or less, it is decided that the head traveling performance is good (O), and when the μK exceeds 0.7, it is decided that the head traveling performance is poor (x). The coefficient μK represents a critical point which determines the traveling performance of a magnetic head when this film is used as a recording medium having an evaporated magnetic layer.

(11) Intrinsic Viscosity

The intrinsic viscosity is calculated from the solution viscosity measured in an o-chlorophenol at 25° C. according to the following equation:

$$\eta_{sp}/C=[\eta]+K[\eta]^2 \cdot C$$

wherein $\eta_{sp}$=(solution viscosity/solvent viscosity)−1. C is the weight (g/100 ml, generally 1.2) of the polymer dissolved in 100 ml of solvent, and K is the Huggins' constant (0.343). The solution viscosity and the solvent viscosity are measured by using an Ostwald viscometer.

(12) Resistance to Edge Damage

A tape of ½ inch wide obtained by slitting the film is traveled on a stainless guide pin (surface roughness: Ra 40 nm) by using a tape traveling tester (traveling speed: 250 m/min, winding angle: 600, outlet side tension: 100 g, number of travels: 200 reciprocating motions). After traveling, seaweed-like elongation at the edge of the tape is visually observed. When no elongation is observed, it is decided that the resistance to edge damage is excellent.

(13) Ratio of Protrusions Due to Polymer

The protrusions to be measured are etched with a solvent (for example, HFIP/chloroform, depending upon the polymer type), which dissolve both polymers 1 and 2 in the thickness direction of the film, in observation under a scanning electron microscope (SEM) with a magnification of x10,000 to x100,000. When the material causing the protrusions remains as an insoluble material, the material causing the protrusions are considered as inert particles (I). When substantially no insoluble material remains, the material causing the protrusions is considered as the polymer 1 or polymer 2 (II). Observation is performed by this method in 20 fields of view having an area of 25 µm² to determine the average of II/(I+II).

A test method is also performed according to demand, in which a cross section of the surface layer of the film is observed under a transmission electron microscope (TEM) with a magnification of x100000 to 500000 (corresponding to 100 protrusions) to examine whether or not the material causing the protrusions are present below the protrusions.

(14) Average Dispersion Diameter of Polymer 2

Apparatus: Transmission electron microscope (H-7100FA model, produced by Hitachi Co.)

Condition: Acceleration voltage 100 kV

Sample preparation: Ultrathin sectioning

Sample thickness: 50 nm

Image analysis: A negative of a transmission electron microscope photograph of each sample is input to a computer by using a dedicated scanner (Image Pro Plus, produced by Planetron Co.). Then, image analysis is performed by using a dedicated software (Leafscan 45 Plug-In, produced by Nihon Saitechs Co.) to measure the diameters corresponding to circles of a high-contrast component at randomly selected 100 points. The average of the measurements is considered as an average dispersion diameter.

(15) Glass Transition Temperature (Tg)

Specific heat measurement is performed by using the apparatus under conditions described below according to JIS K7121.

Apparatus: Temperature-modulated DSC produced by TA Instrument Co.

Measurement conditions:

Heating temperature: 270 to 570 K (RCS cooling method)

Temperature calibration: Melting points of high-purity indium and tin

Temperature modulation amplitude: +1 K

Temperature modulation cycle: 60 seconds

Heating step: 5 K

Sample weight: 5 mg

Sample container: Aluminum open container (22 mg)

Reference container: Aluminum open container (18 mg)

The glass transition temperature was calculated by the following equation:

Glass transition temperature=(Extrapolated glass transition onset temperature+Extrapolated glass transition end temperature)/2

(16) Overall Evaluation

When all the evaluation items of the heat traveling performance, the electromagnetic conversion property, the dropout, the traveling durability of a magnetic tape are ○, or when one of the items is Δ, and the remainders are ○, it is decided that the tape has excellent properties as a base film for a high-density magnetic recording medium. When at least two of the items are Δ, or at least one of the items was x, it is decided that the tape cannot be used as the base film for a high-density magnetic recording medium.

An embodiment of the present invention will be described below on the basis of the examples below. In these examples, polyethylene terephthalate is abbreviated to PET, poly(ethylene 2,6-naphthalenedicarboxylate) is abbreviated to PEN, polyetherimide is abbreviated to PEI, polysulfone is abbreviated to PSF, polyethersulfone is abbreviated to PES, and polypropylene is abbreviated to PP.

EXAMPLE 1

Polyethylene terephthalate PET) pellets (50 weight percent, Tg: 81° C.) having an intrinsic viscosity of 0.85, which was prepared by a conventional method, and Ultem 1010 (50 weight percent, Tg: 216° C.) having an intrinsic viscosity of 0.68 made by General Electric (GE) were supplied into a vent two-screw kneading extruder rotating in the same direction which was heated to 290° C. to prepare blend chips (II) containing 50 weight percent PEI.

Next, filming was performed using three extruders. Pellets of polyethylene terephthalate (PET) (B1) having an intrinsic viscosity of 0.62 and substantially not containing inert particles were dried in vacuum at 180° C. for 3 hours and supplied to extruder B heated to 280° C. Mixed material (A) of 70 parts by weight of the blend chips prepared by the above pelletizing operation and 30 parts by weight of PET chips having an intrinsic viscosity of 0.65 was dried in vacuum at 180° C. for 3 hours and supplied to extruder A heated to 280° C. Pellets of polyethylene terephthalate (PET) (C1) having an intrinsic viscosity of 0.62 and containing 0.3 weight percent spherical silica particles having an average diameter of 0.17 µm and 0.05 weight percent spherical silica particles having an average diameter of 0.3 µm were dried in vacuum at 180° C. for 3 hours and supplied to extruder C heated to 280° C. Next, these were converged in a T die so that polyester composition (B1) became a base layer and polyester composition (A1) and polyester composition (C1) became outermost layers, and brought into tight contact with a cast drum having a surface temperature of 25° C. by applying electrostatic charge, and solidified by being cooled to prepare a three-layer-laminated unstretched film (the ratio of thicknesses of the laminated layers A1/B1/C1=0.07/5/1).

The unstretched film was stretched 3.4 times in the longitudinal direction by one stage at a temperature of 105° C. using a stretching roller and stretched 3.4 times in the transverse direction at a temperature of 95° C. using a tenter. Then, this was stretched 1.3 times in the longitudinal direction by two stages at a temperature of 140° C. using a stretching roller and stretched 1.8 times in the transverse direction at a temperature of 190° C. using a tenter. The film was heat-set at a temperature of 210° C. for 10 seconds under a fixed length and was relaxed by 2% in the transverse direction to prepare a biaxially oriented film having a thickness of approximately 6.1 am. The thicknesses of individual layers were 0.07 µm for the A layer, 5 µm for the B layer, and 1 µm for the C layer.

This biaxially oriented film exhibited, as shown in Table 2, reduced dropout and superior properties as a base film for magnetic recording media, such as electromagnetic conversion properties and travel durability.

EXAMPLE 2

As shown in Table 1, the polymer for the B layer was changed to a blend polymer of 90 weight percent polyethylene terephthalate and 10 weight percent polyether imide (the same as that used for the A layer), without a change in the polymers for the A layer and the C layer to prepare a biaxially oriented film, as in EXAMPLE 1. Thicknesses of these layers were 0.1 µm for the A layer, 5 µm for the B layer, and 1 µm for the C layer.

This biaxially oriented film exhibited, as shown in Table 2, reduced dropout and superior properties as a base film for magnetic recording media, such as electromagnetic conversion properties and travel durability.

EXAMPLE 3

As shown in Table 1, the polyether imide content in the polymer for the A layer was changed without change in the polymers for the B layer and the C layer to prepare a biaxially oriented film, as in EXAMPLE 1. Thicknesses of these layers were 0.5 µm for the A layer, 5 µm for the B layer, and 0.5 µm for the C layer.

This biaxially oriented film exhibited, as shown in Table 2, reduced dropout and superior properties as a base film for magnetic recording media, such as electromagnetic conversion properties and travel durability.

EXAMPLE 4

As shown in Table 1, the polyether imide content in the A layer was changed and another A layer was provided on the opposite side of the B layer instead of the C layer to form an A/B/A triple-layer, as in EXAMPLE 1. Thicknesses of the A layers at the front and back surfaces were different from each other. The thicknesses of these layers were 0.3 µm for the A layer, 5 µm for the B layer, and 0.1 µm for the other A layer.

This biaxially oriented film exhibited, as shown in Table 2, reduced dropout and superior properties as a base film for magnetic recording media, such as electromagnetic conversion properties and travel durability.

EXAMPLE 5

As shown in Table 1, the polyether imide content in the A layer was changed and the inert particles contained in the C layer was changed to 0.3 weight percent spherical silica particles having an average particle diameter of 0.17 µm and 0.06 weight percent spherical silica particles having an average particle diameter of 0.3 µm to prepare a biaxially oriented film, as in EXAMPLE 1. The thicknesses of these layers were 1 µm for the A layer, 4 µm for the B layer, and 1 µm for the C layer.

This biaxially oriented film exhibited, as shown in Table 2, reduced dropout and superior properties as a base film for magnetic recording media, such as electromagnetic conversion properties and travel durability.

EXAMPLE 6

As shown in Table 1, the polyether imide content in the A layer was changed and the inert particles contained in the C layer was changed to 0.55 weight percent crosslinked divinylbenzene particles having an average particle diameter of 0.3 µm and 0.05 weight percent crosslinked divinylbenzene particles having an average particle diameter of 0.8 am, to prepare a biaxially oriented film, as in EXAMPLE 1. The thicknesses of these layers were 0.5 µm for the A layer, 3.5 µm for the B layer, and 1 µm for the C layer.

This biaxially oriented film exhibited, as shown in Table 2, reduced dropout and superior properties as a base film for magnetic recording media, such as electromagnetic conversion properties and travel durability.

EXAMPLE 7

As shown in Table 1, the polyether imide content in the A layer was changed, and 0.01 weight percent crosslinked divinylbenzene particles having an average particle diameter of 0.3 µm was contained in the A layer. The C layer was not laminated to prepare an A/B double-layer biaxially oriented film, as in EXAMPLE 1. The thicknesses of these layers were 1 µm for the A layer and 5 µm for the B layer.

This biaxially oriented film exhibited, as shown in Table 2, reduced dropout and superior properties as a base film for magnetic recording media, such as electromagnetic conversion properties and travel durability. Moreover, this biaxially oriented film exhibited superior edge damage resistance.

EXAMPLE 8

As shown in Table 1, the polymer for the A layer was changed to a blend polymer of 50 weight percent polyether imide and 50 weight percent polyethylene terephthalate, and 0.3 weight percent θ-alumina particles having an average primary particle diameter of 0.04 µm was contained in the A layer. Moreover, the polymer for the B layer was changed as shown in Table 1, the inert particles contained in the C layer was changed to 0.55 weight percent crosslinked divinylbenzene particles having an average particle diameter of 0.3 µm and 0.05 weight percent crosslinked divinylbenzene particles having an average particle diameter of 0.8 am, to prepare an A/B/C triple-layer biaxially oriented film, as in EXAMPLE 1 The thicknesses of these layers were 0.4 µM for the A layer, 6 µm for the B layer, and 0.5 µm for the C layer.

This biaxially oriented film exhibited, as shown in Table 2, reduced dropout and superior properties as a base film for magnetic recording media, such as electromagnetic conversion properties and travel durability. Moreover, this biaxially oriented film exhibited superior edge damage resistance.

EXAMPLE 9

As shown in Table 1, the polymer for the A layer was changed to a blend polymer (containing 0.05 weight percent spherical silica particles having an average particle diameter of 0.3 am) of 20 weight percent polyether sulfone (PES) (E2010 made by Mitsui Chemicals, Inc., Tg: 225° C.) and 80 weight percent poly(ethylene-2,6-naphthalene dicarboxylate) Tg: 110° C.), and the polymer for the B layer was changed to poly(ethylene-2,6-naphthalene dicarboxylate) to prepare an A/B double-layer unstretched film, as in EXAMPLE 7. Both ends of the unstretched film were held with clips and the film was introduced to a linear-motor-system simultaneous biaxial stretching tenter. The film was heated to 100° C. and simultaneously biaxially oriented at an area stretching ratio of 12.25 times (the longitudinal stretching ratio: 3.5 times and the transverse stretching ratio: 3.5 times). Next, the film was heated to 150° C. and simultaneously biaxially oriented at an area stretching ratio of 1.96 times (the longitudinal stretching ratio: 1.4 times and the transverse stretching ratio: 1.4 times). The film was heat-set at 210° C. for 10 seconds at a fixed length, and was relaxed by 2% in the longitudinal and transverse directions to a biaxially oriented film having a thickness of 5 µm. The thicknesses of these layers were 1 µm for the A layer and 4 µm for the B layer.

This biaxially oriented film exhibited, as shown in Table 2, reduced dropout and superior properties as a base film for magnetic recording media, such as electromagnetic conversion properties and travel durability. Moreover, this biaxially oriented film exhibited superior edge damage resistance.

EXAMPLE 10

As shown in Table 1, the polymer for the A layer was changed to a blend polymer of 10 weight percent polysulfone (UDEL P-1700 made by Teijin Amoco Engineering Plastics Limited, Tg: 275° C.) and 90 weight percent poly(ethylene-2,6-naphthalene dicarboxylate) (Tg: 110° C.), and the polymer for the B and C layers was changed to poly(ethylene-2,6-naphthalene dicarboxylate) as in EXAMPLE 8, and a biaxially oriented film was prepared by a stretching method according to EXAMPLE 1. The thicknesses of these layers were 0.5 μm for the A layer, and 3.5 μm for the B layer, and 0.5 μm for the C layer.

This biaxially oriented film exhibited, as shown in Table 2, reduced dropout and superior properties as a base film for magnetic recording media, such as electromagnetic conversion properties and travel durability.

EXAMPLE 11

As shown in Table 1, the polymer for the A layer was changed to a blend polymer of 20 weight percent polysulfone and 80 weight percent polyethylene terephthalate and the polymer for the B layer was changed to a blend polymer (containing 0.05 weight percent spherical silica particles having an average particle diameter of 0.3 μm) of 10 weight percent polysulfone and 90 weight percent polyethylene terephthalate as in EXAMPLE 9, and a biaxially oriented film was prepared by a stretching method according to EXAMPLE 1. The thicknesses of these layers were 2 μm for the A layer and 4 μm for the B layer.

This biaxially oriented film exhibited, as shown in Table 2, reduced dropout and superior properties as a base film for magnetic recording media, such as electromagnetic conversion properties and travel durability.

EXAMPLE 12

As shown in Table 1, the polymer for the A layer was changed to a blend polymer (B12) (containing 0.3 weight percent spherical silica particles having an average diameter of 0.015 μm) of 50 weight percent polyether polyimide and 50 weight percent polyethylene terephthalate as in EXAMPLE 1, a single-layer unstretched film was prepared using an extruder, and a biaxially oriented film was prepared as in EXAMPLE 9. The thickness of this film was 6.2 am.

This biaxially-oriented film exhibited, as shown in Table 2, reduced dropout and superior properties as a base film for magnetic recording media, such as electromagnetic conversion properties and travel durability.

COMPARATIVE EXAMPLE 1

An unstretched film was prepared as in EXAMPLE 1, except that the polymer for the A layer was changed to polyethylene terephthalate (PET) containing 2.0 weight percent spherical silica particles having an average diameter of 0.025 μm in the triple-layer laminate.

Next, a biaxially oriented film having a thickness of approximately 6.1 μm was prepared by a consecutive biaxial stretching process as in EXAMPLE 1. The thicknesses of the individual layers were 0.07 μm for the A layer, 5 μm for the B layer, and 1 μm for the C layer.

As shown in Table 2, this biaxially oriented film was inferior in the use for magnetic recording media.

COMPARATIVE EXAMPLE 2

An unstretched film was prepared as in EXAMPLE 3, except that the polymer for the A layer was changed to polyethylene terephthalate (PET) substantially not containing inert particles in the triple-layer laminate.

Next, a biaxially oriented film was prepared by a consecutive biaxial stretching process as in EXAMPLE 3. The thicknesses of the individual layers were 0.3 μm for the A layer, 4 μm for the B layer, and 0.7 μm for the C layer.

As shown in Table 2, this biaxially oriented film was inferior in the use for magnetic recording media.

COMPARATIVE EXAMPLE 3

A biaxially stretched film was prepared as in COMPARATIVE EXAMPLE 1, except that the average diameter, content, and the like of the inert particles in the A layer were changed, as shown in Table 1. The thicknesses of the individual layers were 0.1 μm for the A layer, 4 μm for the B layer, and 0.9 μm for the C layer.

As shown in Table 2, this biaxially oriented film was inferior in the use for magnetic recording media.

COMPARATIVE EXAMPLES 4 to 6

Biaxially stretched films were prepared as in EXAMPLE 1, except that the content of the polyether imide in the A layer, the average diameter and content of the inert particles in the A layer, the type of the polymer in the B layer, and the like were changed, as shown in Table 1. The thicknesses of the individual layers were 0.8 μm for the A layer, 4 μm for the B layer, and 0.2 μm for the C layer in COMPARATIVE EXAMPLE 4; 1 μm for the A layer, 5 μm for the B layer, and 1 μm for the C layer in COMPARATIVE EXAMPLE 5; and 1 μm for the A layer and 5 ml for the B layer in COMPARATIVE EXAMPLE 6.

As shown in Table 2, these biaxially oriented films were inferior in the use for magnetic recording media.

COMPARATIVE EXAMPLE 7

Blend chips of polypropylene (Tg: −18° C.) (10 weight percent) and polyethylene terephthalate (Tg: 81° C.) (90 weight percent) were prepared as in EXAMPLE 1. An unstretched film was prepared from the chips using an extruder without lamination.

This unstretched film was stretched 3.4 times in the longitudinal direction by one stage at a temperature of 100° C. using a roller stretching machine and stretched 3.4 times in the transverse direction at a temperature of 95° C. using a tenter to prepare a biaxially oriented film having a thickness of approximately 14.0 μm.

As shown in Table 2, these biaxially oriented films were inferior in the use for magnetic recording media.

COMPARATIVE EXAMPLE 8

A single-layer unstretched film was prepared using an extruder by changing the types of the polymers and the content of polymer 2 in the A layer, as shown in Table 1. However, this unstretched film exhibited too poor biaxial stretchability to prepare a biaxially oriented film.

TABLE 1-a

|  | A layer polymer (wt %) | B layer polymer | A layer particle Particle type | Particle diameter (μm) | Content (wt %) | Film structure |
|---|---|---|---|---|---|---|
| Example 1 | PEI/PET (=35/65) | PET | No | — | — | A/B/C |
| Example 2 | PEI/PET (=35/65) | PEI/PET (=10/90) | No | — | — | A/B/C |
| Example 3 | PEI/PET (=20/80) | PET | No | — | — | A/B/C |
| Example 4 | PEI/PET (=40/60) | PET | No | — | — | A/B/A |
| Example 5 | PEI/PET (=30/70) | PET | No | — | — | A/B/C |
| Example 6 | PEI/PET (=40/60) | PET | No | — | — | A/B/C |
| Example 7 | PEI/PET (=30/70) | PET | Divinyl benzene | 0.3 | 0.01 | A/B |
| Example 8 | PEI/PET (50/50) | PEI/PET (10/90) | θ-alumina | 0.04 | 0.3 | A/B/C |
| Example 9 | PES/PEN (=20/80) | PEN | Silica | 0.3 | 0.05 | A/B |
| Example 10 | PSF/PEN (=10/90) | PEN | NO |  |  | A/B/C |
| Example 11 | PSF/PET (=20/80) | PSF/PET(=10/90) | No | — | — | A/B |
| Example 12 | PEI/PET (=50/50) | — | Silica | 0.015 | 0.3 | Single layer |
| Comparative Example 1 | PET | PET | Silica | 0.025 | 2.0 | A/B/C |
| Comparative Example 2 | PET | PET | No | — | — | A/B/C |
| Comparative Example 3 | PET | PET | Silica | 0.3 | 0.7 | A/B/C |
| Comparative Example 4 | PEI/PET (=70/30) | PET | No | — | — | A/B/A |
| Comparative Example 5 | PEI/PET (60/40) | PEI/PET (10/90) | δ-alumina | 0.03 | 0.3 | A/B/C |
| Comparative Example 6 | PEI/PET (=3/97) | PEI/PET (=10/90) | No | — | — | A/B |
| Comparative Example 7 | PP/PET (=10/90) | — | No | — | — | single layer |
| Comparative Example 8 | PES/PEN (=80/20) | — | No | — | — | Impossible to form a film |

TABLE 1-b

|  | Number of protrusions on surface of A layer | | | | | Surface roughness Ra (nm) | |
|---|---|---|---|---|---|---|---|
|  | 2–30 nm (10000/mm$^2$) | 2–50 nm (10000/mm$^2$) | 30 nm or more (/mm$^2$) | 50 nm or more (/mm$^2$) | Protrusions due to polymer alloy (%) | A layer side | Side opposite to A layer |
| Example 1 | 1200 | 1200 | 120 | 80 | 100 | 1.4 | 8.0 |
| Example 2 | 1300 | 1300 | 200 | 110 | 100 | 2.3 | 8.0 |
| Example 3 | 800 | 800 | 70 | 50 | 100 | 0.7 | 8.1 |
| Example 4 | 1700 | 1700 | 150 | 80 | 100 | 1.7 | 4.3 |
| Example 5 | 1500 | 1500 | 100 | 65 | 100 | 0.9 | 10.0 |
| Example 6 | 600 | 600 | 120 | 90 | 100 | 2.0 | 8.6 |
| Example 7 | 830 | 830 | 4000 | 4000 | 97 | 1.0 | 6.8 |
| Example 8 | 440 | 450 | 80000 | 1200 | 85 | 2.6 | 10.2 |
| Example 9 | 5000 | 5000 | 6000 | 1200 | 99 | 5.4 | 8.6 |
| Example 10 | 4500 | 4500 | 500 | 130 | 100 | 0.6 | 10.0 |
| Example 11 | 150 | 150 | 200 | 40 | 100 | 3.4 | 6.6 |
| Example 12 | 500 | 500 | 12000 | 3500 | 55 | 5.6 | 5.7 |
| Comparative Example 1 | 1500 | 1500 | 200000 | 4500 | 0 | 2.7 | 8.1 |
| Comparative Example 2 | 50 | 50 | 800 | 200 | 0 | 0.1 | 30 |
| Comparative Example 3 | 350 | 400 | 400000 | 4000 | 0 | 24 | 15 |
| Comparative Example 4 | 10000 | 10000 | 50000 | 8000 | 100 | 30 | 29 |
| Comparative Example 5 | 30 | 30 | 100 | 20 | 10 | 5.2 | 10.0 |
| Comparative Example 6 | 2 | 5 | 30000 | 10000 | 100 | 200 | 180 |
| Comparative Example 7 | 1 or less | 1 or less | 21000 | 21000 | 100 | 680 | 660 |
| Comparative Example 8 | — | — | — | — | — | — | — |

TABLE 2

|  | Frictional co-efficient (μK) | S/N(dB) Initial | S/N(dB) After 200 travels | Drop out (/min) Initial | Drop out (/min) After 200 travels | Head traveling performance | Electro-magnetic convention property | Drop out | Traveling durability of magnetic tape | Overall evaluation |
|---|---|---|---|---|---|---|---|---|---|---|
| Example 1 | 0.65 | +4.4 | +4.2 | 0 | 2 | ○ | ○ | ○ | ○ | ○ |
| Example 2 | 0.63 | +4.6 | +4.6 | 4 | 6 | ○ | ○ | ○ | ○ | ○ |
| Example 3 | 0.68 | +4.6 | +4.1 | 3 | 8 | ○ | ○ | ○ | ○ | ○ |
| Example 4 | 0.56 | +3.9 | +3.8 | 0 | 4 | ○ | ○ | ○ | ○ | ○ |
| Example 5 | 0.63 | +4.4 | +4.3 | 1 | 2 | ○ | ○ | ○ | ○ | ○ |
| Example 6 | 0.53 | +3.7 | +3.7 | 1 | 2 | ○ | ○ | ○ | ○ | ○ |
| Example 7 | 0.45 | +3.6 | +3.5 | 22 | 35 | ○ | ○ | Δ | ○ | ○ |
| Example 8 | 0.33 | +3.9 | +3.7 | 12 | 22 | ○ | ○ | ○ | ○ | ○ |
| Example 9 | 0.49 | +3.5 | +3.3 | 8 | 18 | ○ | ○ | ○ | ○ | ○ |
| Example 10 | 0.45 | +3.2 | +3.1 | 18 | 25 | ○ | ○ | ○ | ○ | ○ |
| Example 11 | 0.69 | +4.1 | +3.9 | 8 | 13 | ○ | ○ | ○ | ○ | ○ |
| Example 12 | 0.38 | +3.0 | +2.9 | 10 | 12 | ○ | Δ | ○ | ○ | ○ |
| Comp. Example 1 | 0.66 | +4.6 | +3.4 | 24 | 78 | ○ | ○ | x | x | x |
| Comp. Example 2 | *1) 0.8 or more | +5.3 | +0.5 | 4 | 85 | x | Δ | x | x | x |
| Comp. Example 3 | 0.24 | +1.8 | +0.5 | 30 | 65 | ○ | Δ | x | Δ | x |
| Comp. Example 4 | 0.35 | −0.6 | −0.8 | 45 | 60 | ○ | x | x | ○ | x |
| Comp. Example 5 | 0.48 | +1.6 | +1.2 | 29 | 57 | ○ | Δ | x | Δ | x |
| Comp. Example 6 | 0.16 | −3.3 | −3.4 | 280 | 350 | ○ | x | x | x | x |
| Comp. Example 7 | 0.28 | −4.5 | −4.5 | 310 | 390 | ○ | x | x | x | x |
| Comp. Example 8 | *2) | — | — | — | — | *2) | — | — | — | x |

*1) Impossible to measure
*2) Impossible to form a film.

INDUSTRIAL APPLICABILITY

The biaxially oriented film of the present invention can be applied to magnetic recording materials, capacitors, thermal transfer ribbons, thermosensible stencil sheets, and the like. In particular, this film exhibits superior electromagnetic conversion characteristics, travel durability, travel characteristics on magnetic heads when this is used as a base film for a recording magnetic medium, and has significantly noticeable industrial merits.

The invention claimed is:

1. A biaxially oriented film comprising;
at least two layers including a film layer A of a polymer alloy composed of at least one of polyethylene terephthalate or poly(ethylene-2,6-naphthalenedicarboxylate) (polymer 1) and a polyetherimide (polymer 2) as essential components, and a base layer B;
said film layer A being laminated as an outermost layer to the base layer B;
wherein a content $W_A$ (% by weight) of the Polymer 2 of the film layer A and a content $W_B$ (% by weight) of the polymer 2 of the base layer B satisfy the following relations:
$0 \leq W_B \leq 40$
$5 \leq W_A \leq 50$
$10 \leq W_A - W_B \leq 40$; and
wherein micro protrusions having a height of 2 to 50 nm are formed at a density of 1,000,000 to 90,000,000/mm² on an outer surface of the film layer A.

2. A biaxially oriented film according to claim 1, wherein the number of the micro protrusions is 3,000,000 to 60,000,000/mm².

3. A biaxially oriented film according to claim 1, wherein the height of the micro protrusions is 2 to 30 nm.

4. A biaxially oriented film according to claim 1, wherein at least some of the micro protrusions are made of the polymer 1 or the polymer 2.

5. A biaxially oriented film according to claim 4, wherein 30% or more of the micro protrusions are made of the polymer 1 or the polymer 2.

6. A biaxially oriented film according to claim 1, wherein the polymer 2 has a higher glass transition temperature (Tg) than the polymer 1.

7. A biaxially oriented film according to claim 1, wherein the polymer 2 has compatibility with the polymer 1.

8. A biaxially oriented film according to claim 1, wherein the polymer 1 comprises polyethylene terephthalate.

9. A biaxially oriented film according to claim 1, wherein the number of the protrusions having a height of 50 nm or more is 3000/mm² or less.

10. A biaxially oriented film according to claim 1, wherein the number of the protrusions having a height of 30 nm or more is 1500/mm² or less.

11. A biaxially oriented film according to claim 1 comprising another film layer C laminated as the opposite outermost layer to form a laminated structure comprising at least three layers including the film layer A, the base layer B and the film layer C.

12. A biaxially oriented film according to claim 11, wherein a surface roughness $Ra_A$ on the film layer A side is 0.2 to 10 nm, a surface roughness $Ra_C$ on the film layer C side is 1 to 30 nm, and $Ra_C$ is larger than $Ra_A$.

13. A biaxially oriented film according to claim 1, wherein the base layer B comprises the polymer 1 or the polymer alloy composed of the polymer 1 and the polymer 2.

14. A biaxially oriented film according to claim 1, wherein the number of the protrusions having a height of 50 nm or more on the film layer A side surface is 3000/mm² or less.

15. A biaxially oriented film according to claim 1, wherein the number of the protrusions having a height of 30 nm or more on the film layer A side surface is 1500/mm² or less.

16. A biaxially oriented film according to claim 1, wherein the content $W_A$ (% by weight) of the polymer 2 of the film layer A and the content $W_B$ (% by weight) of the polymer 2 of the base layer B satisfies the following relations:

$0 \leq W_B \leq 25$
$25 \leq W_A \leq 40$
$10 \leq W_A - W_B \leq +\& \ 40$.

17. A biaxially oriented film according to claim 1, wherein the film layer A contains substantially no inert particles.

18. A biaxially oriented film according to claim 1, wherein the film layer A contains 0.001 to 2% by weight of inert particles having an average particle diameter of 0.01 to 2 µm.

19. A biaxially oriented film according o claim 18, wherein the film layer A contains 0.01 to 1% by weight of inert particles having an average particle diameter of 0.01 to 1 µm.

20. A magnetic recording medium comprising a biaxially oriented film according to claim 1, and a magnetic layer provided on one side of the biaxially oriented film.

21. A magnetic recording medium according to claim 20, wherein the magnetic layer comprises a ferromagnetic metal thin film.

22. A magnetic recording medium according to claim 20, wherein the magnetic layer comprises a ferromagnetic metal fine powder dispersed in a binder.

23. A biaxially oriented film according to claim 2, wherein the height of the micro protrusions is 2 to 30 nm.

24. A biaxially oriented film according to claim 11, wherein the film layer C comprises a polyester.

25. A biaxially oriented film according to claim 11, wherein the film layer C comprises the same polymer as the base layer B.

* * * * *